Dec. 28, 1965  A. G. LAUTZENHISER  3,226,711
MAGNETIC SHAFT ENCODER WITH RELATIVELY
MOVING TOOTHED MEMBERS
Filed March 10, 1961  2 Sheets-Sheet 1

INVENTOR.
Argyle G. Lautzenhiser
BY
Paul J. Ethington
ATTORNEY

Dec. 28, 1965 A. G. LAUTZENHISER 3,226,711
MAGNETIC SHAFT ENCODER WITH RELATIVELY
MOVING TOOTHED MEMBERS
Filed March 10, 1961 2 Sheets-Sheet 2

INVENTOR.
Argyle G. Lautzenhiser
BY
Paul J. Ethington
ATTORNEY

United States Patent Office 3,226,711
Patented Dec. 28, 1965

3,226,711
MAGNETIC SHAFT ENCODER WITH RELATIVELY MOVING TOOTHED MEMBERS
Argyle G. Lautzenhiser, Essex, Mass., assignor to General Motors Corporation, Detroit, Mich., a corporation of Delaware
Filed Mar. 10, 1961, Ser. No. 94,923
4 Claims. (Cl. 340—359)

This invention relates to a shaft position encoder and more particularly to a variable reluctance transducer for developing a digital signal as an indication of angular displacement.

Prior art shaft position encoder devices use a stator cooperating with a rotor movable with a shaft so that when the shaft and rotor suffer an angular displacement the magnetic reluctance of certain flux paths is changed according to the amount of displacement, thereby providing an amplitude modulation of the flux. The amplitude modulation is detected by transformer type pickup devices responsive to rate of flux change, which require an alternating current magneto-motive force (M.M.F.) source. In such devices the frequency of the A.C. source must be much greater than the maximum modulating frequency. Power losses of magnetic materials generally increase with frequency creating problems of supplying such power and dissipating it in the magnetic structure.

The objects of this invention are to provide a variable reluctance pickup having low power requirements and having a high signal output and additionally which is of simple construction and yet being independent of mechanical tolerances.

The invention is carried out by providing a toothed rotor and a toothed stator having an air gap which would have a variation of reluctance according to changes in tooth alignment. A source of constant M.M.F is in series with the air gap so that the relative motion of the teeth will create a flux amplitude modulation. A detector device whose output is a function of the magnetic flux rather than the rate of change of flux is used to generate an output signal which is an indication of angular displacement.

Figure 1:
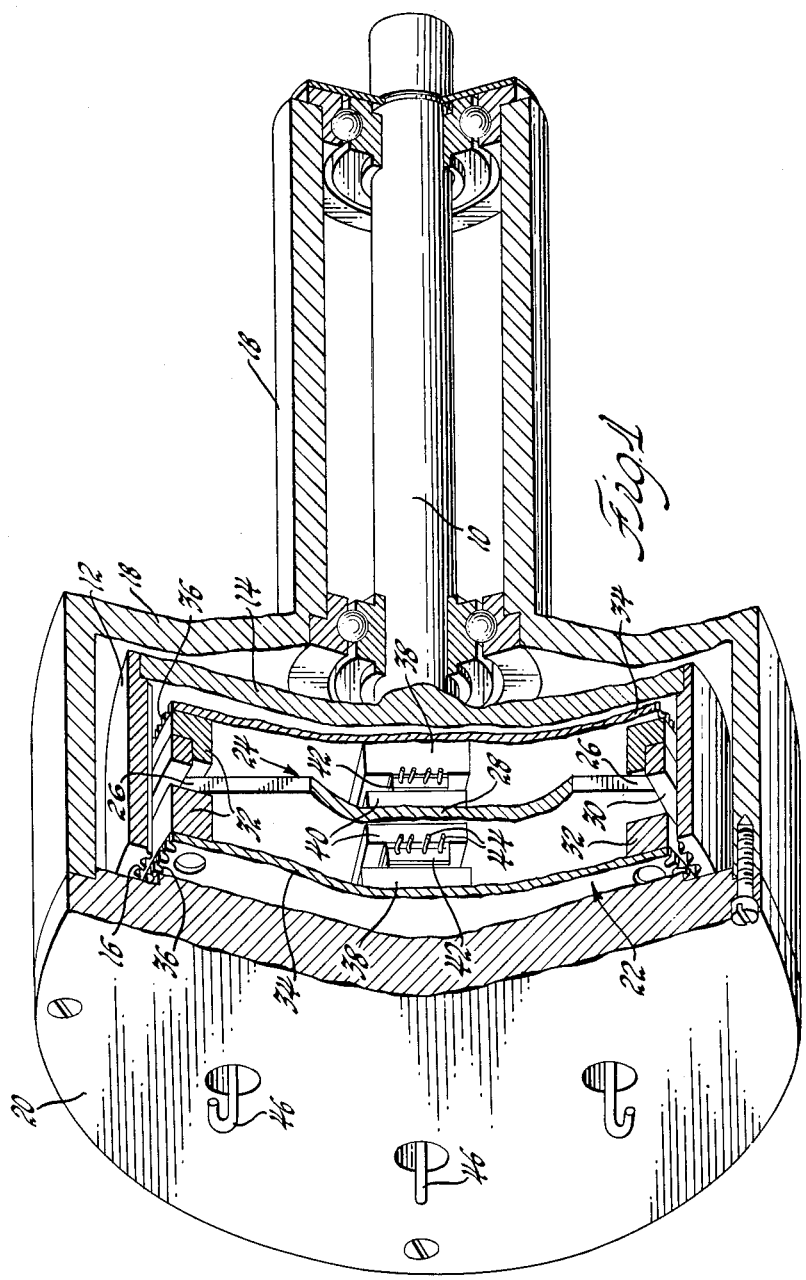
Figure 2:
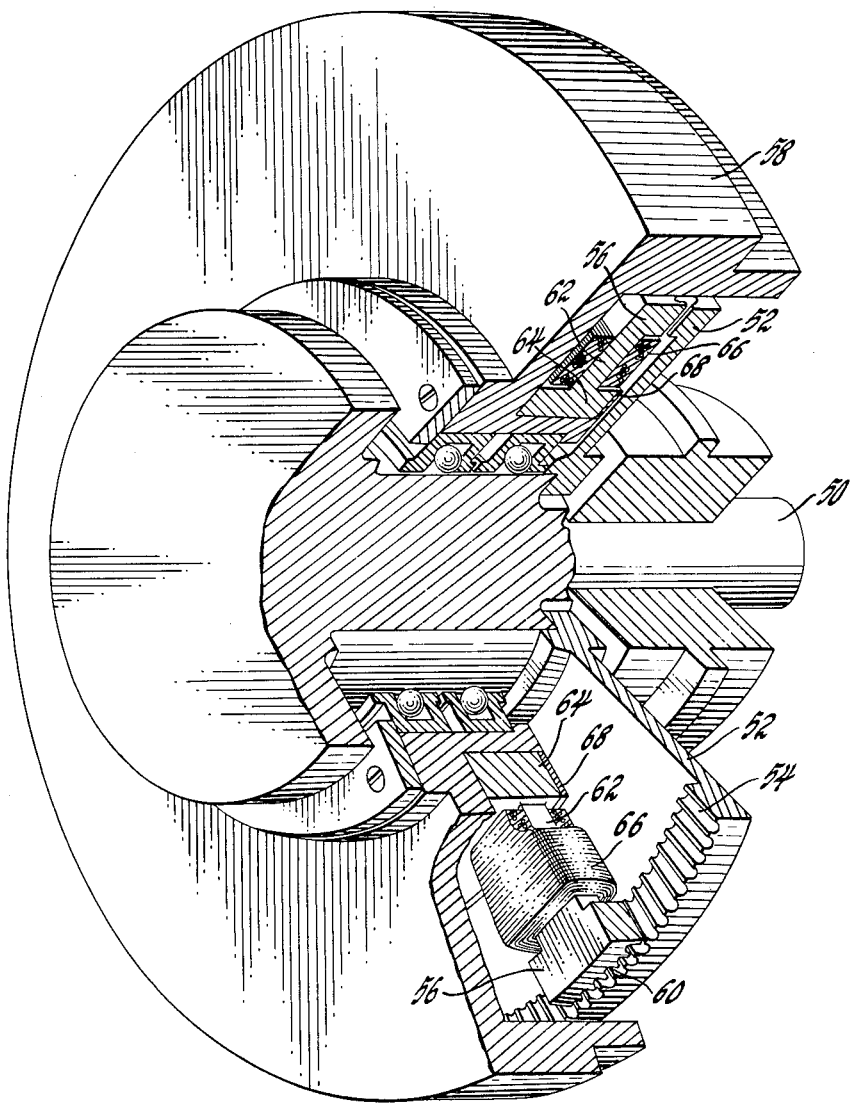

The above and other advantages will be made more apparent from the following specification taken in conjunction with the accompanying drawings, in which, FIGURE 1 is a partly broken away perspective view of the preferred embodiment of a shaft position encoder according to the invention, and FIGURE 2 is a partly broken away perspective view of another embodiment of the invention.

Referring to FIGURE 1 the preferred embodiment of the encoder includes a rotatable shaft 10 whose angular displacement is to be measured. An annular rotor 12 of low reluctance magnetic material such as Armco iron is closed at one end by a disc 14 and the center of the disc 14 is rigidly secured to the shaft 10 for movement therewith. The internal surface of the rotor 12 is formed into teeth 16. A stationary housing 18 around the shaft and the rotor 12 has a removable cap portion 20 which supports the stator assembly 22 of the encoder. This stator assembly 22 is contained within the cavity of the annular rotor 12 and is substantially concentric therewith. Centrally disposed in the stator assembly 22 is a permanent bar magnet 24 having north poles at both ends 26 and a south pole in the middle 28, or vice-versa. The ends 26 of the magnet are secured to a low reluctance iron pole ring 30 which is concentric with and closely spaced from the toothed inner surface 16 of the rotor 12. An annular aluminium spacer 32 is placed on either side of the pole ring and each spacer 32 supports a low reluctance disc 34 also concentrically located within the rotor 12. Each of the discs 34 has on its periphery a series of teeth 36 equal in number to the teeth 16 on the rotor 12 so that all of the stator teeth can be in alignment with the rotor teeth simultaneously. Preferably the two discs 34 are misaligned by a portion of a tooth pitch so that upon movement of the rotor 12 the flux cycle in one disc 34 will lead or lag that of the other by about a quarter of a cycle or 90° according to the direction of movement. Each of the discs 34 has a low reluctance pole piece 38 secured to the center thereof which projects toward the center pole 28 of the magnet 24, and the magnet 24 carries similar pole pieces 40 in alignment with the first mentioned pole pieces 38. The gap between each adjacent set of pole pieces 38, 40 contains a flux detector 42 having output leads 44. Terminals 46 extending through the cap 20 are connected to leads 44 by suitable wiring (not shown).

The device then comprises a pair of parallel magnetic circuits having in common a permanent magnet 24 encircled by an iron pole ring 30, and each circuit has a portion of the toothed rotor 12, the air gap bounded by the teeth of rotor 12 and stator 34, a toothed stator 34, two pole pieces 38, 40 and a detector 42. Preferably, the detector 42 is a Hall effect device wherein the output voltage is proportional to the product of the magnetic flux density and input current. When the input current is held constant the output voltage will be proportional to the flux density. A commercial form of such a detector is the Halltron. This device will measure the flux density of a static or dynamic magnetic field and does not depend for its operation upon a changing magnetic field. The permanent magnet 28 may be replaced by some other source of constant M.M.F. such as a direct current excited electromagnet. In most instances, however, a permanent magnet is preferable since it has the advantage of having no external power requirements, thereby economizing on weight, space, and power consumption. The annular rotor 12 may have its teeth 16 extending continuously from one stator disc 34 to the other, as shown, but an alternate construction would include a smooth land portion, not shown, opposite the pole ring 30 so that the air gap between the pole ring 30 and rotor 16 could be made quite small.

In operation, as the shaft 10 rotates the teeth 16 of the rotor 12 will alternately move into and out of alignment with the teeth 36 of the discs 34. When the teeth 16 of the rotor are in alignment with the teeth 36 of one of the discs the flux density through that particular magnetic circuit will be at a maximum and consequently the voltage output of the detector 42 will also be at a maximum. Of course, minimum values of detector voltage will occur when the teeth are half way between points of alignment. Thus as the shaft 10 rotates an output voltage will be produced which is a digital signal indicative of angular displacement and may be operated upon by suitable circuitry to give data as to angular shaft displacement, velocity or acceleration. By utilizing two discs 34 slightly out of phase with each other, the direction of shaft movement may be indicated by comparing the phase of the output voltage from each detector 42.

The permeability of magnetic materials is not a linear function of the magnetic flux intensity or the M.M.F.

On the other hand, non-magnetic materials do exhibit such a linear function although the permeability is relatively low. If a magnetic circuit is operated below the saturating flux density of the magnetic material a small air gap will linearize the permeability characteristic of the circuit; then the reluctance of the circuit will be a linear function of the size of the air gap. If the surfaces of the magnetic material in the gap are shaped into teeth the reluctance of the gap will be a function of the alignment of these teeth and the teeth may be shaped with a primary purpose of obtaining a large difference of reluctance between aligned and misaligned positions. However, when the air gap is formed with toothed surfaces the reluctance is altered by a factor known as the fringe factor which is a function of the gap distance as well as the tooth profile. The fringe factor may, by well known methods, be adjusted to linearize the reluctance function with respect to the gap distance. Then, if the tooth alignment is held fixed, it is inherent that increasing the air gap between the teeth a small amount would give the same change of reluctance as decreasing the air gap the same amount. This linearization is important in making the encoder independent of mechanical tolerances.

There are several advantages to having an equal number of teeth on the stator and rotor, for example, a large reluctance variation with rotation is obtained since the reluctance change can be summed over the entire periphery. Individual tooth variations are relatively unimportant since they will be averaged out over a large number of teeth. In addition, with a linear gap distance vs. reluctance characteristic, no reluctance variation will be obtained when the centers of the two members are displaced. The displacement of the centers has no average effect since an increase of the gap spacing at one point leads to an equal decrease at a diametrically opposite point. These characteristics lead to a high signal capability as well as a relative independence in the gear teeth profile tolerances and mounting tolerances. Only a single flux detector is necessary in each of the magnetic circuits since mechanical errors are cancelled mechanically rather than electrically.

Referring to FIGURE 2 of the drawings, the embodiment of the invention illustrated therein comprises a shaft 50 having a plate secured thereto for rotation therewith. One face of the plate 52 has near its periphery a set of gear teeth 54. Four sectors 56 secured to a stationary housing 58 are spaced around the periphery of the plate 52 and have teeth 60 extending toward the teeth 54 of the plate and closely spaced therefrom. Each toothed sector 56 forms one leg of a U-shaped magnetic core 62 which extends radially of the plate 52 and has the other leg 64 of the U projecting toward the plate 52 at a point inwardly of the sector 56. A direct current excited coil 66 around each core serves as the source of M.M.F. A flux density sensing device 68 similar to that discussed for the embodiment of FIGURE 1 is placed between the plate 52 and the inner leg 64 of the magnet core 62. It is readily seen that four magnetic circuits are provided each comprising a core 62, the air gap bounded by teeth 54 and 60, a portion of plate 52 and the detector 68. Thus as the shaft 50 and plate 52 rotate the relative motion of the plate teeth 54 and sector teeth 60 will cause an amplitude modulation of the flux through each circuit so that each detector 68 will produce a digital output signal which is a function of the shaft displacement. A permanent magnet, of course, may be substituted for the electromagnet 62, 66. Each of the four sectors 56 are out of phase with the others, preferably by one fourth of a tooth pitch. This has the advantage that in addition to providing an indication for the direction of shaft rotation by comparison of the signal phases it also produces a vernier effect so that the position of the shaft may be determined more accurately. For example, when the shaft rotates an amount equal to the pitch of the teeth four equally spaced signals will be generated whereas with the device of FIGURE 1 only two signals are produced and those are not equally spaced so that for most purposes the device of FIGURE 2 would be four times as sensitive as that of FIGURE 1.

It may thus be readily seen that this invention provides an improved variable reluctance pickup having low power requirements, a high signal output, a simple construction and independence of normal mechanical tolerances.

It is intended that the above description of invention is merely illustrative of the preferred embodiments and that many deviations from them within the spirit of the invention may be readily made and that the scope of the invention is limited only by the following claims.

I claim:

1. A shaft position encoder for detecting the relative movement between a stationary member and a shaft member comprising: an annular cup-shaped rotor member of magnetic material secured to said shaft, said annular cup-shaped rotor member including inwardly extending and evenly spaced toothed members formed on the inner periphery of said rotor; said stationary member including a pair of parallel discs of magnetic material concentrically positioned within said annular cup-shaped rotor member with toothed members formed around the periphery of each of said discs, said disc toothed members having spacing complementary to the spacing of said rotor toothed members and an opposingly spaced apart position from the toothed members of said rotor to provide a variable air gap spacing therebetween; an elongated magnet means positioned between said discs having end poles of like polarity positioned adjacent the periphery of the discs and a center pole of opposite polarity to produce a magnetic flux through a pair of parallel magnetic circiuts wherein each circuit includes said rotor toothed members, the toothed members of one of said discs and the air gap therebetween; plural Hall effect magnetic detectors with constant input currents coupled to said magnetic circuits between each of said discs and said center magnetic pole, each of said Hall effect detectors producing an electrical pulse when the magnetic flux of said magnetic circuits are varied by the movement of said rotor member so that one of said rotor teeth replaces the same opposing position of an adjacent rotor tooth relative to one of said disc toothed members.

2. The shaft position encoder as described in claim 1 wherein the toothed members of one disc are mechanically misaligned with the toothed members of the other disc relative to the rotor toothed members so that said rotor movement produces detector output signals which are electrically out of phase.

3. A shaft position encoder for producing electrical signals to indicate the position of a shaft relative to a stationary member comprising: a disc rotor of magnetic material secured to said shaft including toothed members extending radially and having equal circumferential spacing on one face of said disc rotor; plural radially extending magnetic core members secured to said stationary member so as to be arcuately displaced from each other and positioned along radii of said disc, each of said radial core members including a first end terminating in a sector of toothed members opposingly aligned with the toothed members of said disc rotor to provide a variable air gap spacing therebetween and a second core end having a Hall effect magnetic detector with a constant input current positioned adjacent said disc face; a source of magnetomotive force intermediate the ends of each of said radial core members to produce a magnetic flux through a magnetic circuit wherein said circuit includes the radial core member, opposing toothed members of the core sector and the disc rotor and the air gap therebetween; each of said Hall effect magnetic detectors being coupled to said magnetic circuit to produce an electrical output pulse when the flux of said circuit is varied by movement of said shaft rotor wherein one of said disc toothed members replaces the same opposing position of an adjacent disc toothed member relative to a tooth of the associated radial core toothed sector.

4. A shaft position encoder as described in claim 3 wherein the toothed sector of each radial core member is mechanically misaligned with the toothed sector of each other radial core member relative to the disc toothed members so that said rotor movement produces output signals from said magnetic detector which are electrically out of phase.

References Cited by the Examiner

UNITED STATES PATENTS

| | | | |
|---|---|---|---|
| 2,512,325 | 6/1950 | Hansen | 324—45 X |
| 2,805,677 | 9/1957 | Baird | 324—70 X |
| 2,943,307 | 6/1960 | Sampson | 324—70 X |
| 3,018,395 | 1/1962 | Carlstein | 324—45 X |

WALTER L. CARLSON, *Primary Examiner.*

FREDERICK M. STRADER, *Examiner.*